(12) United States Patent
Coronado

(10) Patent No.: US 6,530,608 B1
(45) Date of Patent: **\*Mar. 11, 2003**

(54) UNIVERSAL ADAPTER FOR CONNECTORS AND VALVES

(75) Inventor: Eduardo Q. Coronado, Garza Garcia (MX)

(73) Assignee: Coflex, S.A. De C.V., Nuevo Leon (MX)

( \* ) Notice: Subject to any disclaimer, the term of this patent is extended or adjusted under 35 U.S.C. 154(b) by 0 days.

This patent is subject to a terminal disclaimer.

(21) Appl. No.: 10/058,635

(22) Filed: Jan. 29, 2002

Related U.S. Application Data

(63) Continuation of application No. 09/533,312, filed on Mar. 22, 2000, now Pat. No. 6,354,637.

(51) Int. Cl.⁷ ................................................ F16L 17/00
(52) U.S. Cl. ........................................ 285/357; 285/333
(58) Field of Search ................................ 285/357, 356, 285/353, 393, 148.23, 148.18, 333, 12; 411/178

(56) References Cited

U.S. PATENT DOCUMENTS

| | | | | |
|---|---|---|---|---|
| 1,707,087 A | \* | 3/1929 | Little | 285/357 |
| 2,172,532 A | \* | 9/1939 | Fentress | 285/222.4 |
| 2,456,418 A | \* | 12/1948 | Imerman | 228/182 |
| 2,546,348 A | \* | 3/1951 | Schuman | 285/123.12 |
| 4,798,404 A | \* | 1/1989 | Iyanicki | 285/12 |
| 5,542,718 A | \* | 8/1996 | Gronwick et al. | 285/298 |

\* cited by examiner

*Primary Examiner*—Teri Pham Luu
(74) *Attorney, Agent, or Firm*—Baker & McKenzie; William D. McSpadden

(57) ABSTRACT

An adapter and associated apparatus for transferring gas/fluid are presented herein. The adapter is configured to connect valves and connectors of plural sizes to each other. The adapter includes an outer surface having an outer thread for connection to a tightening nut of the connector. The adapter also includes a first and second inner surfaces sized for different size valves.

18 Claims, 5 Drawing Sheets

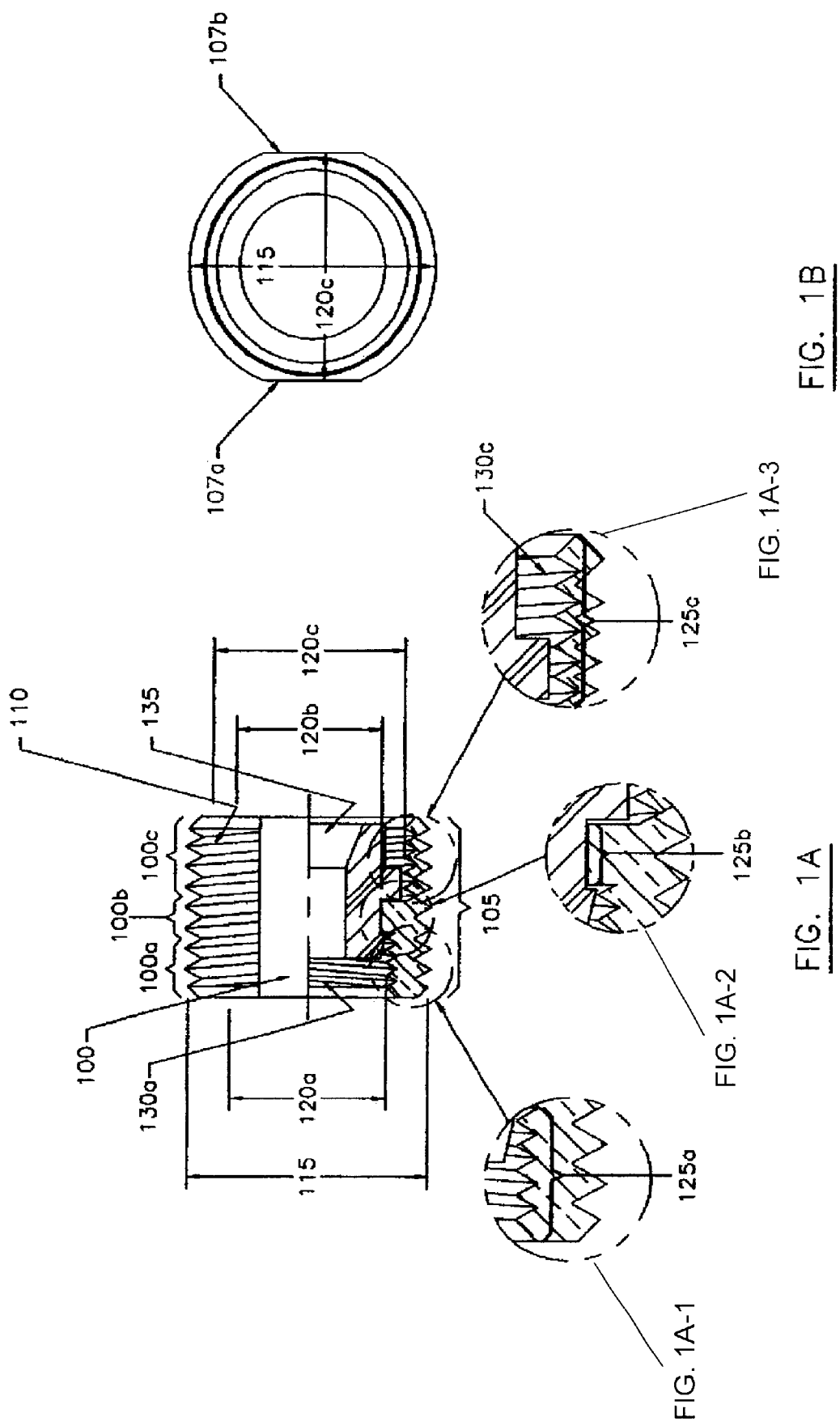

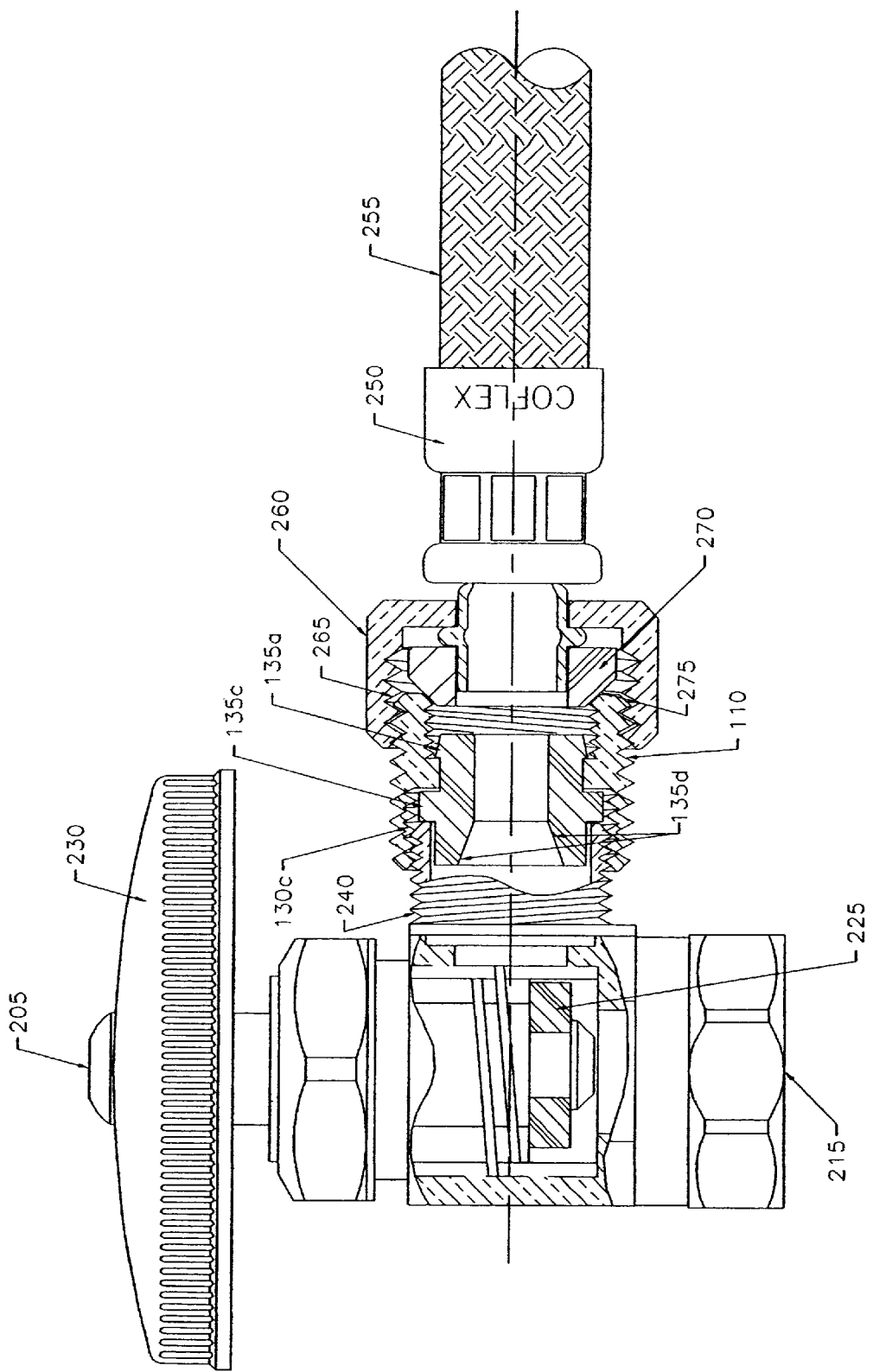

UNIVERSAL ADAPTER FOR CONNECTORS AND VALVES

REFERENCE TO RELATED APPLICATIONS

This application claims priority to and is a continuing application of U.S. patent application Ser. No. 09/533,312 which has a filing date of Mar. 22, 2000, U.S. Pat. No. 6,354,637.

FIELD

The present application for patent relates to fluid and gas transfer equipment, and more particularly to adapters for connecting connectors to gas or fluid valves.

BACKGROUND

Gas and fluid transfer systems typically include valves and any number of connectors. The valves receive the gas or fluid from a sources and can either permit or block the flow of the gas or fluid to a destination. Where the valve permits the flow of gas/fluid, the gas/fluid is received by the connector.

The connector and the valve connection is air tight, thereby preventing the release of gas/fluid. The air tight connection is achieved by threadably connecting the opening of the valve with one end of the connector. To make a threadable connection, the connector and valve must be appropriately sized for each other.

Valves and connectors are usually manufactured, distributed, and sold separately from each other and in a variety of different sizes. Accordingly, combinations of valves and connectors of different sizes are incompatible. An adapter is used to establish a connection between valves and connectors of differing sizes.

An adapter includes a first portion which is sized for and threadably receives the valve and a second portion which is sized for and threadably receives the connector. However, to connect a particular valve to a particular connector, the adapter must appropriately sized for both. As the variety of sizes of valves and connectors grows linearly (n), the number of types of adapters needed grows on an n 2 basis. As the number of differently sized adapters grows, stocking and inventory problems arise as sellers must keep appropriate stock of each sized adapter.

Accordingly, it would be advantageous if the number of adapters required to match each of a set of valves to each of a set of connectors could be reduced.

SUMMARY

The present invention is directed to an adapter capable of connecting plural sizes of valves to a connector. The adapter has an outer surface with a thread thereon for connection to the connector. The adapter also has a distal inner surface with a thread thereon to accept a first sized valve, and a proximate inner surface with a thread thereon to accept a valve of a second size.

BRIEF DESCRIPTION OF THE DRAWINGS

FIG. 1A is a diagram of an adapter in accordance with the teachings of the present invention;

FIG. 1B is a diagram of an overhead view of the adapter illustrated in FIG. 1A;

FIG. 2B is an illustration of a gas/fluid transport apparatus in accordance with a first embodiment of the present invention;

DETAILED DESCRIPTION

Figure 2A:
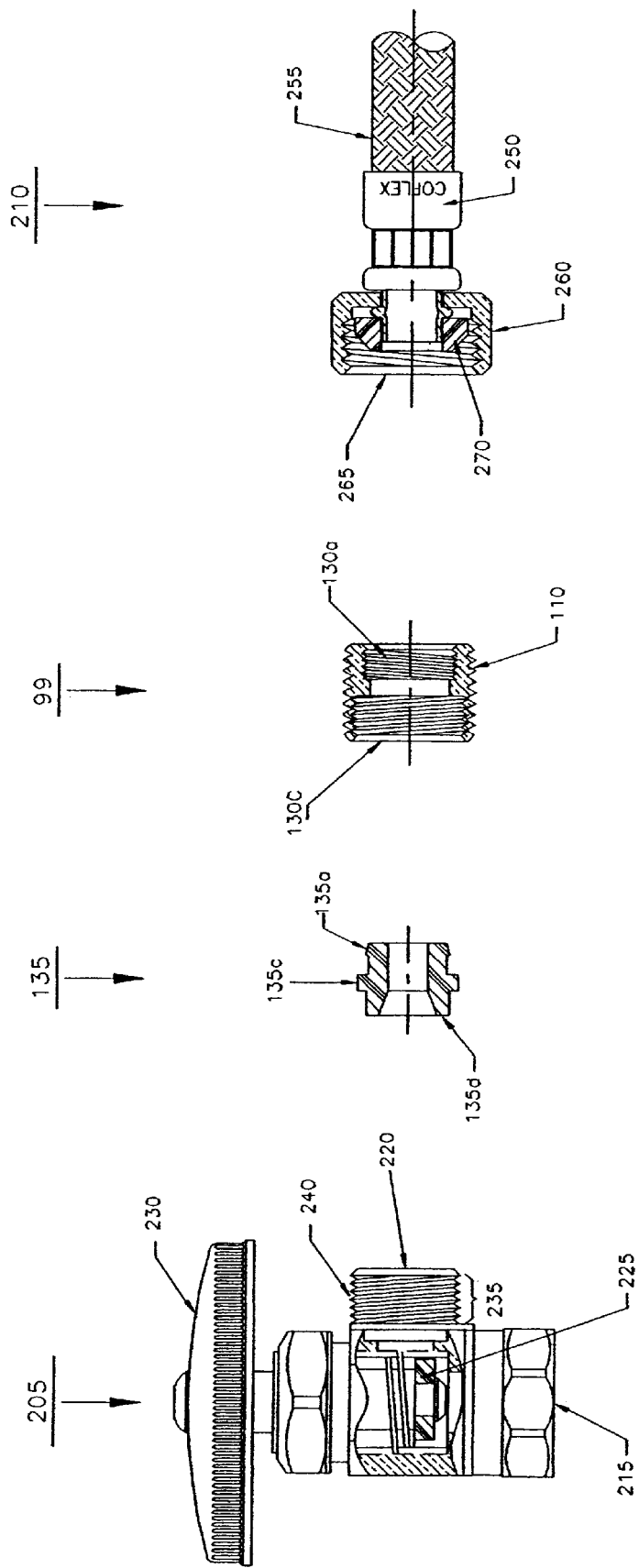
FIG. 2A is an illustration of a valve, seal, adapter, and a connector, connectable to form a first embodiment of the present invention.

Referring now to FIG. 1A, there is illustrated a diagram of an adapter in accordance with the teachings and principals of the present invention. The adapter includes a hollow substantially cylindrical member 100 made of, for example, plastic or a non-ferrous metal, such as brass. The cylindrical member 100 includes an outer surface 105 with an outwardly extending thread 110. The outer surface 105 is capable of receiving an appropriately sized connector by mating the thread 110 on the outer surface 105 with a thread on an inner surface of the connector.

Referring now to FIG. 1B, there is illustrated an overhead view of the adapter illustrated in FIG. 1A. The outer surface 105 can also include flat surfaces 107*a*, 107*b* to facilitate tightening or removing the adapter from the valve/connecting with a wrench or pliers.

The cylindrical member 100 includes a first portion 100*a*, a second portion 100*b*, and a third portion 100*c*. The first portion 100*a* is hollow and substantially cylindrical with an outer diameter 115, a first diameter 120*a*, and a first inner surface 125*a*. The second portion 100*b* is hollow and substantially cylindrical with outer diameter 115, a second diameter 120*b*, and a second inner surface 125*b*. The third portion 100*c* is hollow and substantially cylindrical with outer diameter 115, a third diameter 120*c*, and third inner surface 125*c*. The first diameter 120*a* is smaller than the third diameter 120*c*.

The first portion 100*a* includes a first thread 130*a* about the first inner surface 125*a* and having a diameter equal to the first diameter 120*a*. The third portion 100*c* includes a second thread 130*c* about the third inner surface 125*c* and having a diameter equal to the third diameter 120*c*. The first portion 100*a*, and third portion 100*c* are each capable of receiving an appropriately sized valve by mating the first thread 130*a* or second thread 130*c* with a thread on an outer surface of the valve or connector.

The adapter includes a seal 135 to facilitate an air tight connection between the adapter and valve received at either the first portion 100*a* or third portion 100*c*. The seal 135 can be made of a flexible material such as thermoplastic rubber, nitrile rubber, or etylene-propylene-compound diene rubber. The seal 135 is also hollow and substantially cylindrical with an outwardly extending skirt 135*a*, an outwardly extending step 135*c*, and an inverse skirt 135*d*. The seal 135 has a diameter selected to be similar to the second diameter 120*b*, while the skirt 135*a* has a maximum diameter selected to be similar to the first diameter 120*a*, and the step 135*c* has a diameter selected to be similar to the third diameter 120*c*.

The seal 135 is disposed inside the cylindrical member 100, such that the step 135*c* is surrounded by the third portion 100*c* and the skirt 135*a* is surrounded by the first portion 100*a*. The step 135*c* and the base of the skirt 135*a* preferably rest against opposite sides of the second region 100*b*. When a valve is received by the third portion 100*c*, the step 135*c* is pressed against the side of the second portion 100*b*, thereby forming an air tight seal.

Referring now to FIG. 2A, there is illustrated a block diagram of a gas/fluid transport apparatus configured in accordance with a first embodiment of the present invention. FIG. 2A illustrates a valve 205, a seal 135, an adapter 99, and a connector 210. FIG. 2B illustrates the gas/fluid transport apparatus formed by connecting the valve 205, seal 135, adapter 99, and the connector 210 in accordance with the teachings of the present invention.

The valve 205 receives gas/fluid transports through a first opening 215 and transports the gas/fluid through a second opening 220. The transport of the gas/fluid is controlled by a gate 225 which either blocks or permits the flow of the gas/fluid by opening or closing a passage from the first opening 215 to the second opening 220. The passage is opened or closed by rotating a faucet head 230.

The second opening 220 is surrounded by a substantially cylindrical region 235 which includes a thread thereon 240. The cylindrical region 235, depending on size, is connectable to the third inner surface 125c by mating the thread 240 on the cylindrical region 235 with the second thread 130c. Connection of the cylindrical region 235 of the valve 205 to the third inner surface causes the step 135c of the seal 135 to be pressed onto one side of the second region 100b, while the skirt 135a is pressed into the first region 100a.

The connector 210 receives the gas/fluid through an opening 250 in a tube 255 and transports the gas/fluid to a destination, through the tube 255. The tube 255 is attached to a tightening nut 260 with an internal thread 265. The tightening nut 260 is connectable to the outer surface 105 by mating the thread 110 on the outer surface to the internal thread 265.

The tightening nut 260 includes therein a connector seal 270. The connector seal 270 includes a ramp 275 with a rising edge facing the hose 255. The connector seal 270 is sized such that the smallest diameter of the ramp 275 is smaller than the first diameter 120a and largest diameter of the ramp is larger than the third diameter 120c. When the tightening nut 260 is connected to the outer surface 105, the ramp 275 is passed into and against the first region 100a, thereby forming an airtight seal.

Figure 3A:
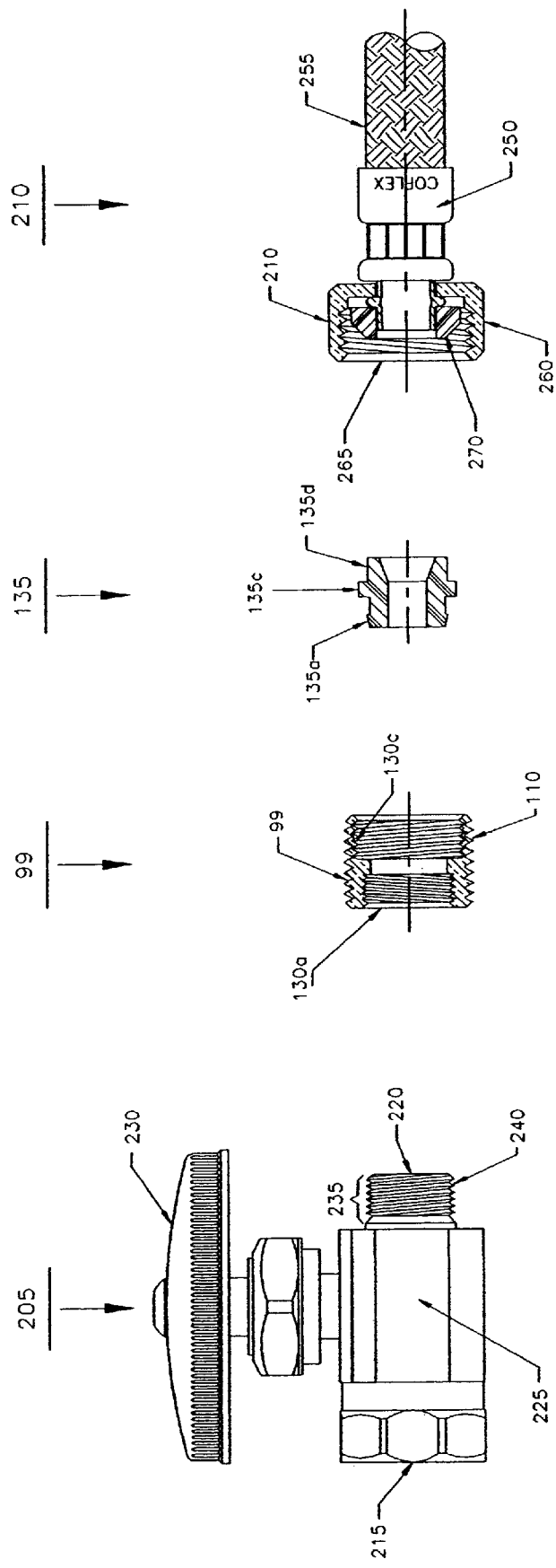
FIG. 3A is an illustration of a valve, seal, adapter, and a connector, connectable to form a second embodiment of the present invention.
Figure 3B:
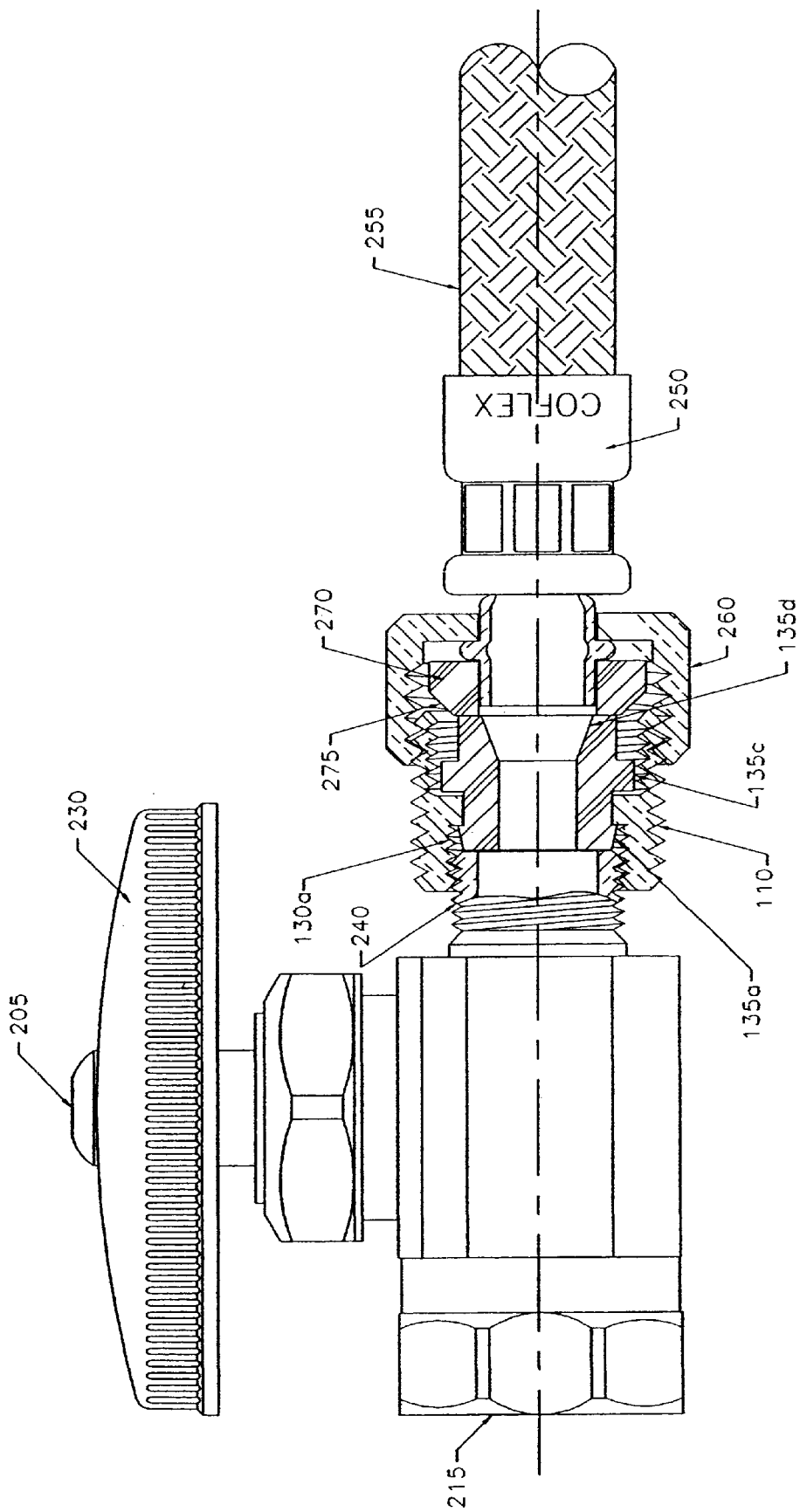
FIG. 3B is an illustration of a gas/fluid transport apparatus in accordance with a second embodiment of the present invention.

Referring now to FIG. 3A, there is illustrated a block diagram of a gas/fluid transport apparatus configured in accordance with a second embodiment of the present invention. FIG. 3A illustrates a valve 205, a seal 135, an adapter 99, and a connector 210. FIG. 3B illustrates the gas/fluid transport apparatus formed by connecting the valve 205, seal 135, adapter 99, and the connector 210 in accordance with the teachings of the present invention.

The substantially cylindrical region 235, depending on size, is connectable to the first inner surface 125a by mating the thread 240 on the cylindrical region 235 with the first thread 130a. The tightening nut 260 is connectable to the outer surface 105 by mating the thread 110 on the outer surface to the internal thread 265. Connection of the tightening nut 260 to the outer surface 105 causes the connector seal 270 to be pressed into and against the third region 100c. Additionally, the falling edge of the ramp 275 is received by the inverse skirt 135d causing the seal 135 to be pressed against the edge of the second portion 100b, thereby forming an airtight seal.

Although preferred embodiments of the present inventions have been illustrated in the accompanying Drawings and described in the foregoing Detailed Description, it will be understood that the inventions are not limited to the embodiments disclosed, but are capable of numerous rearrangements, modifications and substitutions without departing from the spirit of the invention as set forth and defined by the following claims and equivalents thereof.

I claim:

1. An adapter comprising:
    a substantially cylindrical hollow member having an outer surface, a distal inner surface having a distal inner diameter, a medial inner surface having a medial inner diameter, and a proximate inner surface having a proximate inner diameter;
    an outer thread about the outside surface;
    a distal thread about the distal inner surface, the distal thread having a distal thread diameter substantially equivalent to the distal inner diameter;
    a proximate thread about the proximate inner surface, the proximate thread having a proximate thread diameter substantially equivalent to the proximate inner diameter; and
    a seal comprising a substantially cylindrical hollow portion, wherein the hollow portion comprises an outwardly extending step, and wherein the seal is adapted to be fitted within the substantially cylindrical hollow member.

2. An adapter according to claim 1 wherein the hollow portion of the seal has an outer diameter substantially equivalent to the medial inner diameter of the hollow member.

3. An adapter according to claim 2 wherein the outwardly extending step of the seal has an outer diameter substantially equivalent to the proximate inner diameter of the hollow member.

4. An adapter according to claim 1 wherein the seal is adapted such that when it is fitted within the hollow member, the outer diameter of the step of the seal is engaged against the proximate inner surface of the hollow member.

5. An adapter according to claim 4 wherein the seal is adapted such that when it is fitted within the hollow member, the outer diameter of the hollow portion of the seal is engaged against the inner medial surface of the hollow member.

6. An adapter according to claim 1 wherein the seal comprises rubber.

7. An adapter according to claim 1 wherein the seal comprises a material selected from a group consisting of:
    thermoplastic rubber;
    nitrile rubber; and
    etylene-propylene-compound diene rubber.

8. An adapter according to claim 1 wherein the proximate inner diameter is larger than the distal inner diameter.

9. An adapter comprising:
    a substantially cylindrical hollow member having an outer surface, a distal inner surface having a distal inner diameter, a medial portion having a medial inner diameter, and a proximate inner surface having a proximate inner diameter;
    an outer thread about the outside surface;
    a distal thread about the distal inner surface, the distal thread having a distal thread diameter substantially equivalent to the distal inner diameter;
    a proximate thread about the proximate inner surface, the proximate thread having a proximate thread diameter substantially equivalent to the proximate inner diameter; and
    a seal comprising a substantially cylindrical hollow portion, wherein the hollow portion comprises an outwardly extending step and an outwardly extending skirt wherein the seal is adapted to be fitted within the substantially cylindrical hollow member.

10. An adapter according to claim 9 wherein the seal has an outer diameter substantially equivalent to the medial inner diameter of the hollow member.

11. An adapter according to claim 10 wherein the outwardly extending skirt of the seal has an outer diameter substantially equivalent to the distal inner diameter of the hollow member.

12. An adapter according to claim 11 wherein the outwardly extending step of the seal has an outer diameter substantially equivalent to the proximate inner diameter of the hollow member.

13. An adapter according to claim 9 wherein the seal is adapted such that when it is fitted within the hollow member, the outer diameter of the step of the seal is engaged against the proximate inner surface of the hollow member.

14. An adapter according to claim 13 wherein the seal is adapted such that when it is fitted within the hollow member, the outwardly extending skirt of the seal is within the portion of the hollow member defined by the distal inner surface.

15. An adapter according to claim 14 wherein the seal is adapted such that when it is fitted within the hollow member, the step of the seal and a base portion of the outwardly extending skirt of the seal are located on opposite sides of the medial portion of the hollow member.

16. An adapter according to claim 9 wherein the seal comprises rubber.

17. An adapter according to claim 9 wherein the seal comprises a material selected from a group consisting of:

thermoplastic rubber;

nitrile rubber; and etylene-propylene-compound diene rubber.

18. An adapter according to claim 9 wherein the proximate inner diameter is larger than the distal inner diameter.

* * * * *

UNITED STATES PATENT AND TRADEMARK OFFICE
CERTIFICATE OF CORRECTION

PATENT NO. : 6,530,608 B1
DATED : March 11, 2003
INVENTOR(S) : Eduardo Coronado et al.

It is certified that error appears in the above-identified patent and that said Letters Patent is hereby corrected as shown below:

Column 1,
Line 42, delete "n 2" and insert in lieu thereof -- n^2 --; and

Column 3,
Line 4, delete "FIG. 2Aillustrates" and insert in lieu thereof -- FIG.2A illustrates --.

Signed and Sealed this

Twelfth Day of August, 2003

JAMES E. ROGAN
*Director of the United States Patent and Trademark Office*